US011101119B2

(12) United States Patent
Michalski et al.

(10) Patent No.: US 11,101,119 B2
(45) Date of Patent: Aug. 24, 2021

(54) USAGE AND TEMPERATURE COMPENSATION OF PERFORMANCE PARAMETERS FOR NIGHT VISION DEVICE

(71) Applicant: Eagle Technology, LLC, Melbourne, FL (US)

(72) Inventors: Mark Michalski, West Springfield, MA (US); Ransom Hal Castleberry, Blacksburg, VA (US); John A. Balboni, Agawam, MA (US); Arlynn W. Smith, Blue Ridge, VA (US); Raymond Leo Chabot, Chicopee, MA (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 283 days.

(21) Appl. No.: 16/227,165

(22) Filed: Dec. 20, 2018

(65) Prior Publication Data
US 2020/0203136 A1    Jun. 25, 2020

(51) Int. Cl.
*H01J 40/14* (2006.01)
*H01J 40/16* (2006.01)
(Continued)

(52) U.S. Cl.
CPC .............. *H01J 40/16* (2013.01); *H01J 40/02* (2013.01); *H04N 5/23203* (2013.01)

(58) Field of Classification Search
CPC .... H04N 5/228; H04N 5/23203; H04N 5/232; H01J 40/16; H01J 40/02; H01J 31/50
(Continued)

(56) References Cited

U.S. PATENT DOCUMENTS 4,139,798 A    2/1979  Hoover
5,218,194 A    6/1993  Garbi et al.
(Continued)

FOREIGN PATENT DOCUMENTS

JP    2010067861    3/2010
KR    1020100010901  2/2010

OTHER PUBLICATIONS

International Search Report and Written Opinion issued to PCT/US2019/066830 dated Oct. 29, 2020, 13 pages.
(Continued)

*Primary Examiner* — Georgia Y Epps
*Assistant Examiner* — Kevin Wyatt
(74) *Attorney, Agent, or Firm* — K&L Gates LLP

(57) ABSTRACT

A method of controlling the performance of a night vision device includes supplying, by a power supply, to a microchannel plate of a light intensifier tube, a control voltage that controls a gain of the microchannel plate, determining an amount of compensation to apply to the control voltage based on a change to the control voltage attributed to a change in temperature of an operating environment of the night vision device, adjusting the control voltage in accordance with the amount of compensation to obtain a compensated control voltage, and supplying, by the power supply, the compensated control voltage to the microchannel plate of the light intensifier tube. The method may further include determining whether the night vision device has been used for a predetermined amount of time, and only after that predetermined amount of time, is the method configured to supply the compensated control voltage.

6 Claims, 10 Drawing Sheets

(51) Int. Cl.
*H04N 5/232* (2006.01)
*H01J 40/02* (2006.01)

(58) Field of Classification Search
USPC .................................................... 250/214 R
See application file for complete search history.

(56) References Cited

U.S. PATENT DOCUMENTS

| | | | |
|---|---|---|---|
| 5,942,747 A | 8/1999 | Saldana | |
| 5,949,063 A * | 9/1999 | Saldana | H04N 5/33 |
| | | | 250/214 VT |
| 7,190,636 B1 * | 3/2007 | Depaola | H04B 10/1143 |
| | | | 367/131 |
| 2014/0001344 A1 | 1/2014 | Lewis | |

OTHER PUBLICATIONS

International Preliminary Report on Patentability issued to PCT/US2019/066830, dated Jun. 16, 2021, 9 pages.

* cited by examiner

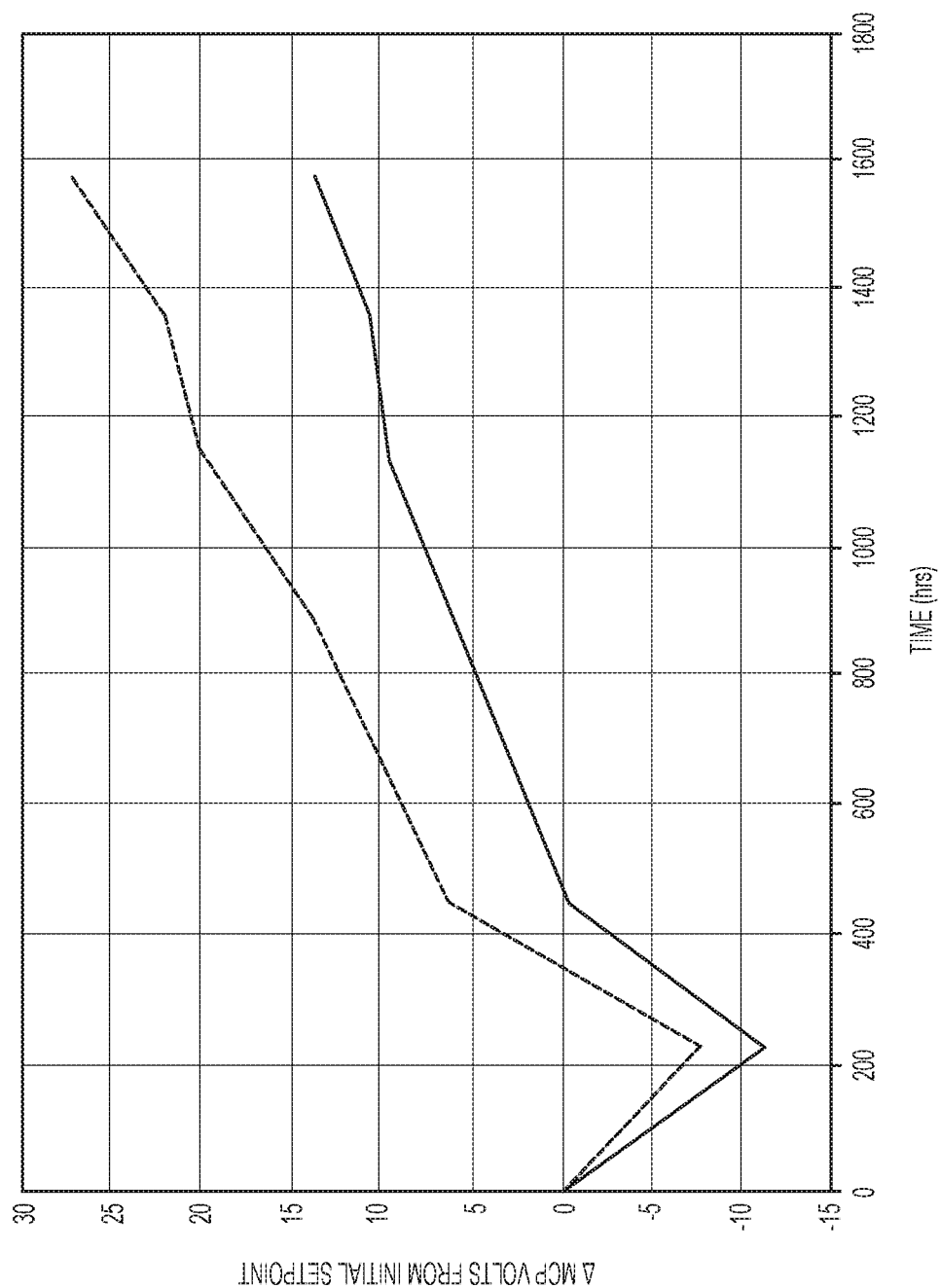

USAGE AND TEMPERATURE COMPENSATION OF PERFORMANCE PARAMETERS FOR NIGHT VISION DEVICE

FIELD OF THE INVENTION

The present invention relates to a night vision device, to a power supply for a night vision device, and, more specifically, to digital and software techniques to maintain the performance of a night vision device subjected to extended usage and temperature extremes.

BACKGROUND

A night vision device may be used in many industrial and military applications. For example, such a device may be used for enhancing the night vision of aviators, for photographing astronomical bodies and for providing night vision to soldiers or sufferers of retinitis pigmentosa (night blindness). The device often incorporates an image intensifier that is used to amplify low intensity light or to convert non-visible light into readily viewable images. One such image intensifier is an image intensifier tube.

An image intensifier tube typically includes a photocathode with for example, a gallium arsenide (GaAs) active layer and a microchannel plate (MCP) positioned within a vacuum housing. Visible and infrared energy, for example, may impinge upon the photocathode and be absorbed in the cathode active layer, thereby resulting in generation of electron/hole pairs. The generated electrons are then emitted into the vacuum cavity and amplified by the MCP.

More specifically, when electrons exit the photocathode, the electrons are accelerated toward an input surface of the MCP by a difference in potential between the input surface of the MCP and the photocathode of approximately 200 to 900 volts depending on the MCP to cathode spacing and MCP configuration (filmed or un-filmed). As the electrons bombard the input surface of the MCP, secondary electrons are generated within the MCP. That is, the MCP may generate several hundred electrons for each electron entering the input surface. The MCP is also subjected to a difference in potential between its input surface and its output surface that is typically about 700-1200 volts. This potential difference enables electron multiplication in the MCP.

As the multiplied electrons exit the MCP, the electrons are accelerated through the vacuum cavity toward a phosphor screen (or other anode surface) by yet another difference in potential between the phosphor screen and the output surface of the MCP. This latter potential may be on the order of approximately 4200-5400 volts.

A power supply integrated, or potted, with the image intensifier tube is generally used to generate and provide the various potential differences noted above, and to still further provide control voltages for various components of the image intensifier tube. The power supply and intensifier tube are expected to operate under a variety of lighting conditions, including, e.g., relatively low light or relatively high light conditions, over varying temperature ranges and over long periods of time. Configuring and controlling a power supply to handle all these conditions is a challenge.

SUMMARY

Described herein are methods of controlling the performance of a night vision device. The method includes supplying, by a power supply, to a microchannel plate of an image intensifier tube, a control voltage that controls the gain of the microchannel plate, determining an amount of compensation to apply to the control voltage based on a change to the control voltage attributed to a change in temperature of an operating environment of the night vision device, adjusting the control voltage in accordance with the amount of compensation to obtain a compensated control voltage, and supplying, by the power supply, the compensated control voltage to the microchannel plate of the image intensifier tube. The method may further include determining whether the night vision device has been used for a predetermined amount of time, and only after that predetermined amount of time, is the method configured to supply an algorithmically determined compensating control voltage to the microchannel plate.

In another embodiment, a method is provided for controlling the performance of a night vision device. The night vision device includes a power supply and an image intensifier tube in communication with the power supply. The method includes supplying, by the power supply, to a microchannel plate of the image intensifier tube, a second control voltage that controls the gain of the microchannel plate, determining whether a difference between the second control voltage and a first control voltage supplied at a time earlier than the second control voltage is less than a predetermined value, when the difference is less than the predetermined value, determining whether the night vision device has been used for a predetermined amount of time, and only after the night division device has been used for the predetermined amount of time, adjusting the second control voltage to compensate for a change to the second control voltage resulting from time of use to obtain a third control voltage; and supplying, by the power supply, the third control voltage to the microchannel plate of the light intensifier tube.

In still another embodiment, a power supply for an image intensifier of a night vision device is provided. The power supply includes power supply circuitry that is configured to supply a control voltage to the image intensifier; a chronometer; a temperature sensor, a memory configured to store control logic, and a processor that is in communication with the chronometer, the temperature sensor and the memory. The processor is configured to execute the control logic to: supply, by the power supply circuitry, to a microchannel plate of the image intensifier, a control voltage that controls the gain of the microchannel plate, determine, based on a value of the chronometer, whether the night vision device has been used for a predetermined amount of time under stress conditions, when the night division device has been used for the predetermined amount of time under stress, determine an amount of compensation to apply to the control voltage based on stress exposure. Additionally, a change to the control voltage attributed to a change in temperature of an operating environment of the night vision device based on a value of the temperature sensor may be present with or without past stress exposure, and the power supply is configured to adjust the control voltage in accordance with the amount of compensation to obtain a compensated control voltage, and supply, by the power supply circuitry, the compensated control voltage to the microchannel plate of the light intensifier.

BRIEF DESCRIPTION OF THE DRAWINGS

FIG. 8B shows the voltage differential that is to be added to the room temperature V2 set point to maintain the same gain as a function of time, in accordance with an embodiment of the present invention.

Like reference numerals have been used to identify like elements throughout this disclosure.

DETAILED DESCRIPTION

Figure 1:
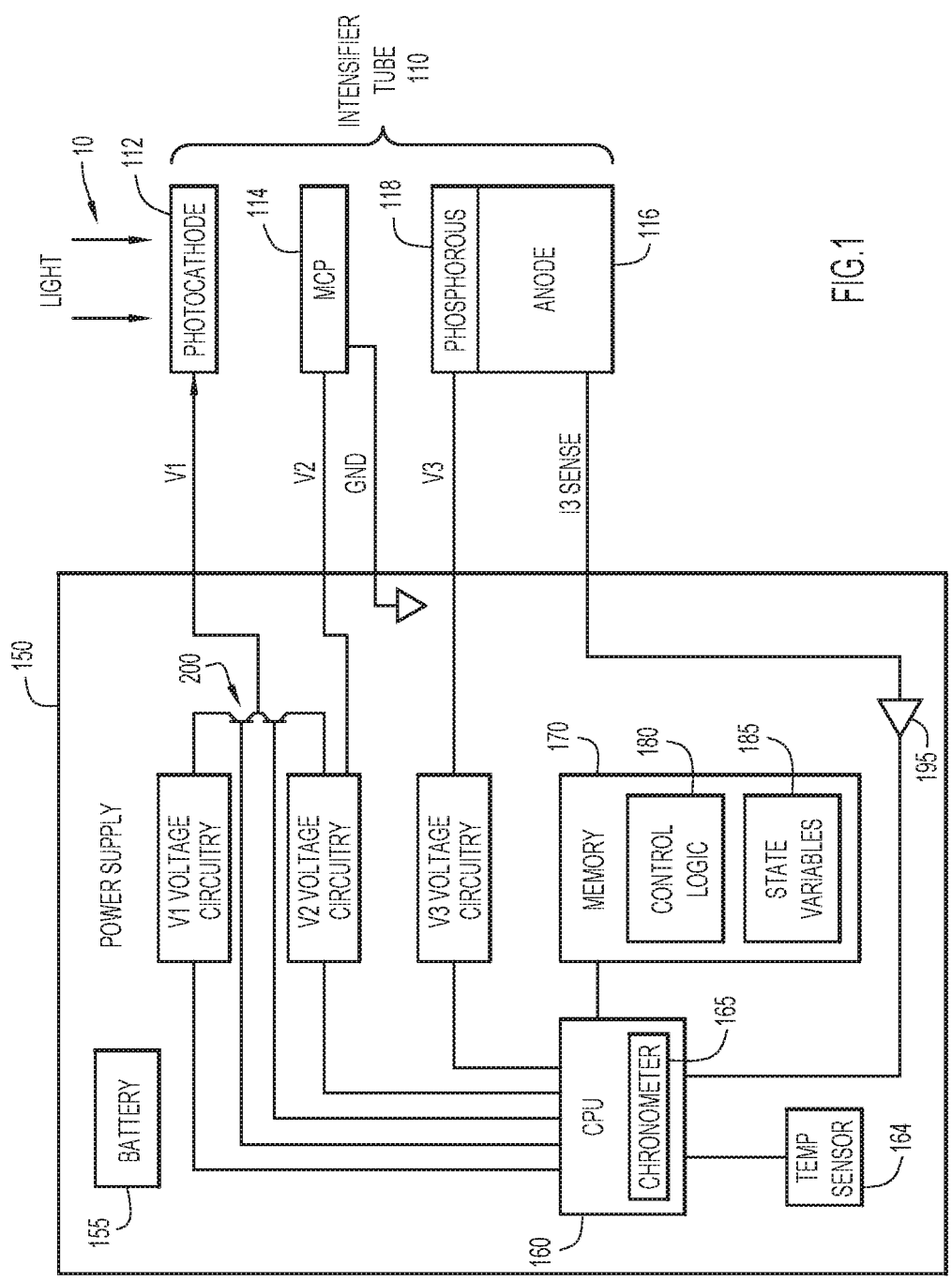
FIG. 1 is a block diagram of a digitally controlled power supply and associated light intensifier in accordance with an embodiment of the present invention.

FIG. 1 is a block diagram of a digitally controlled power supply and associated light intensifier in accordance with an embodiment of the present invention. Specifically, FIG. 1 depicts an image intensifier tube 110 that is powered and controlled by a digitally controlled power supply 150. Intensifier tube 110 includes a photocathode 112, a microchannel plate (MCP) 114 and an anode 116 that includes a phosphor layer 118.

Digitally controlled power supply (or simply "power supply") 150 includes a battery 155, or other energy source, that supplies power that is used by the power supply 150 itself and that is delivered to the intensifier tube 110. The power supply 150 further includes a central processing unit (CPU) 160 and memory 170, which stores, among other things, control logic 180 and state variables (or settings) 185 (discussed further below). Battery 155 supplies power for each of the control voltages V1, V2, and V3, which are respectively applied to components of the intensifier tube 110. The values of these control voltages may be set by CPU 160 in accordance with instructions received from control logic 180 and/or values stored as state variables or settings 185.

In one possible implementation, CPU 160 controls circuitry that controls the application of voltages V1, V2, V3 to the photocathode 112, MCP 114 and anode 116, respectively. An operational amplifier 195 is configured to sense current I3 flowing in anode 116. Current I3 is representative of the brightness of the light 10 being received at photocathode 112 particularly where V1 and V2 are not being modified to control the output brightness of the phosphor screen. A value of current I3 can be used by control logic 180 and CPU 160 to, for example, adjust the value of V1 or V2 (e.g., higher V1 or V2 for higher brightness, and lower V1 or V2 for lower brightness). Power supply 150 also includes temperature sensor 164 and chronometer 165.

An advantage of a digitally controlled power supply 150 is that the control scheme which adjusts the output brightness of the intensifier tube 110, as a function of input light 10, can be selected after the power supply is built, unlike a conventional analog power supply where the control scheme is built into the hardware. Digital control of the power supply 150 allows adjustment of different parameters or settings to activate certain features and/or to ensure that the night vision device complies with, e.g., export restrictions. Digital control of the power supply 150 can also be used to compensate performance parameters in view of temperature and/or usage.

Fixed Brightness Control

Figure 2:
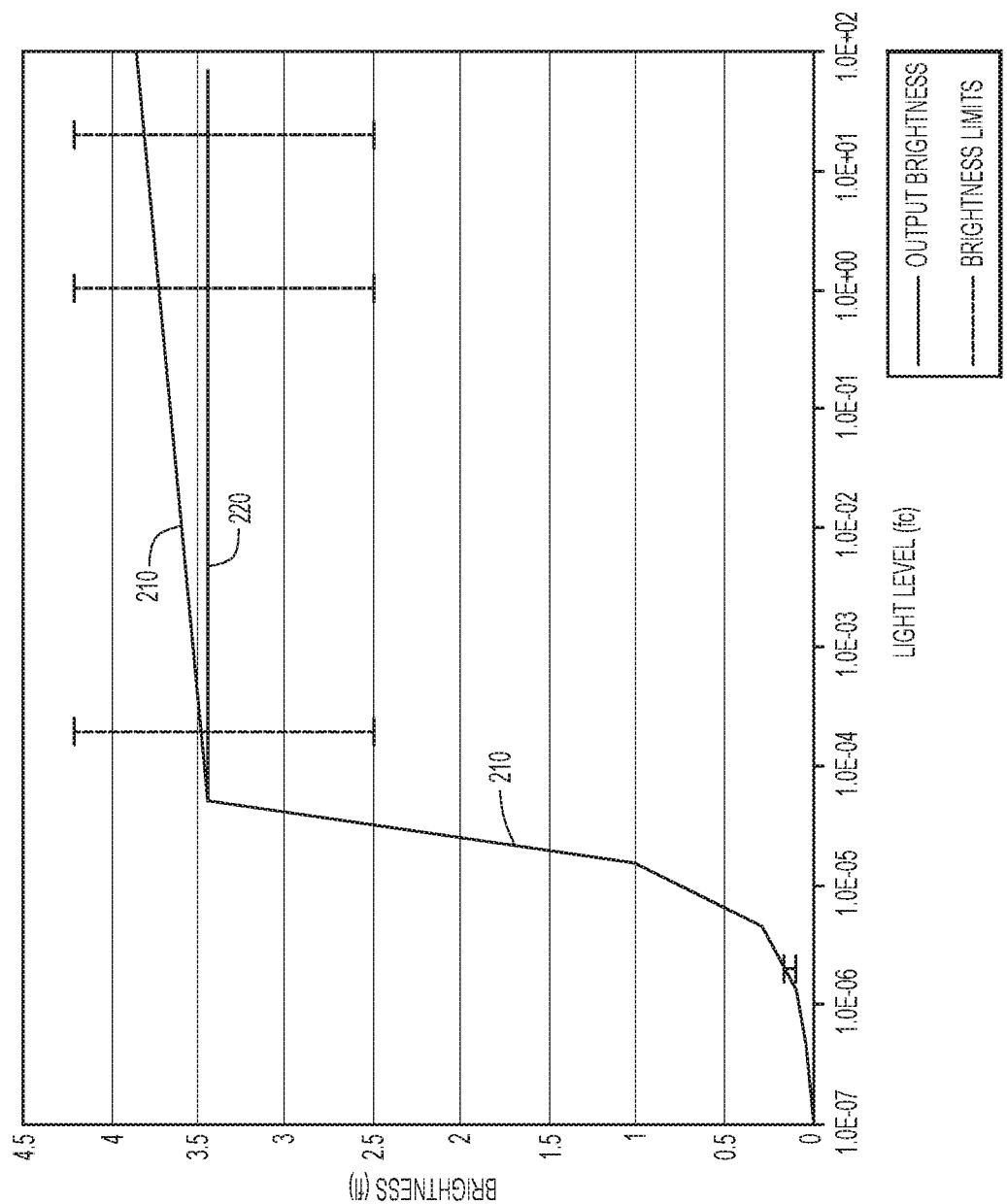
FIG. 2 shows plots of output brightness versus light level in accordance with an embodiment of the present invention.

One function of the power supply 150 and control logic 180 is to control the output brightness of the intensifier tube 110 as a function of input light level to protect the user from the intensified scene becoming overly bright. In this regard, FIG. 2 shows plots of output brightness versus light level in accordance with an embodiment of the present invention. As shown, the output brightness, beyond a predetermined level of received light, is held nearly fixed (between predetermined brightness limits), but, in the case of a typical analog power supply, and as shown by curve 210, nevertheless tends to rise slightly due to the inherent operation of analog circuitry.

On the other hand, with digital control, embodiments of the present invention can generate an output brightness versus light level curve 220 similar to curve 210 but, without the slow rise of curve 210. That is, curve 220 shows that brightness remains truly fixed after about $2 \times 10^{-5}$ fc (foot candle). This steady brightness output is a result of the control logic 180 that drives control voltages (e.g., photocathode control voltage V1) to create a zero differential between the screen current (I3) and a fixed value to achieve the desired screen brightness. A discussion of control voltage manipulation is provided below.

Temperature Compensation

Under an extreme range of operating conditions, e.g., from −50° C. to +50° C., the intensifier tube 110 and power supply 150 are expected to maintain a consistent gain at low light levels and limit the output brightness at higher light levels. As noted above, some of the parameters and control processes in power supply 150 are achieved through adjustments to the voltages ($V_1$ and $V_2$) as well as the $I_3$ current settings. Under certain conditions. In one embodiment, a gain correction algorithm has two operational ranges which correspond to light levels $<2\times10^{-4}$ fc and $>2\times10^{-4}$ fc. At lower levels of illumination ($<2\times10^{-4}$ fc), the output of intensifier tube 110 may be controlled by varying the MCP voltage (V2). However, when the intensifier is subjected to a high enough light level, the image becomes too bright ($>2\times10^{-4}$ fc illumination) and the total light output is capped by limiting the $I_3$ value. As explained in connection with FIG. 2, it is possible to keep the $I_3$ current at or below a user defined limit. This methodology may be referred to as Automatic Brightness Control (ABC), which keeps the screen current ($I_3$) from going above a set point until all of the adjustment parameters have reached their lowest control setting. At light levels that cause this level of screen current, the power supply first controls output brightness by changing $V_2$ to keep the screen current (which is linearly related to output brightness) below a maximum allowed current value, $I_3^{max}$, which corresponds to the maximum allowed output brightness at a fixed temperature. As light levels increase, the $V_2$ drops eventually to a minimum value. Once $V_2$ has hit a first lower limit, luminous output is regulated by decreasing the duty factor of the cathode or $V_1$ voltage.

Under levels of illumination where ABC is not active, gain temperature compensation is carried out by modifying the MCP voltage or $V_2$. At all higher light levels, instead of changing $V_2$ to modify output brightness, the permissible screen current is altered to control luminous output in environments hotter or colder than room temperature. Control logic 180 in power supply 150 is configured to control supply voltages that might change with temperature. In this regard, temperature sensor 164 is provided and can be part of CPU 160 or, as shown, can be a separate component that is in communication with CPU 160 (FIG. 1).

Figure 3:
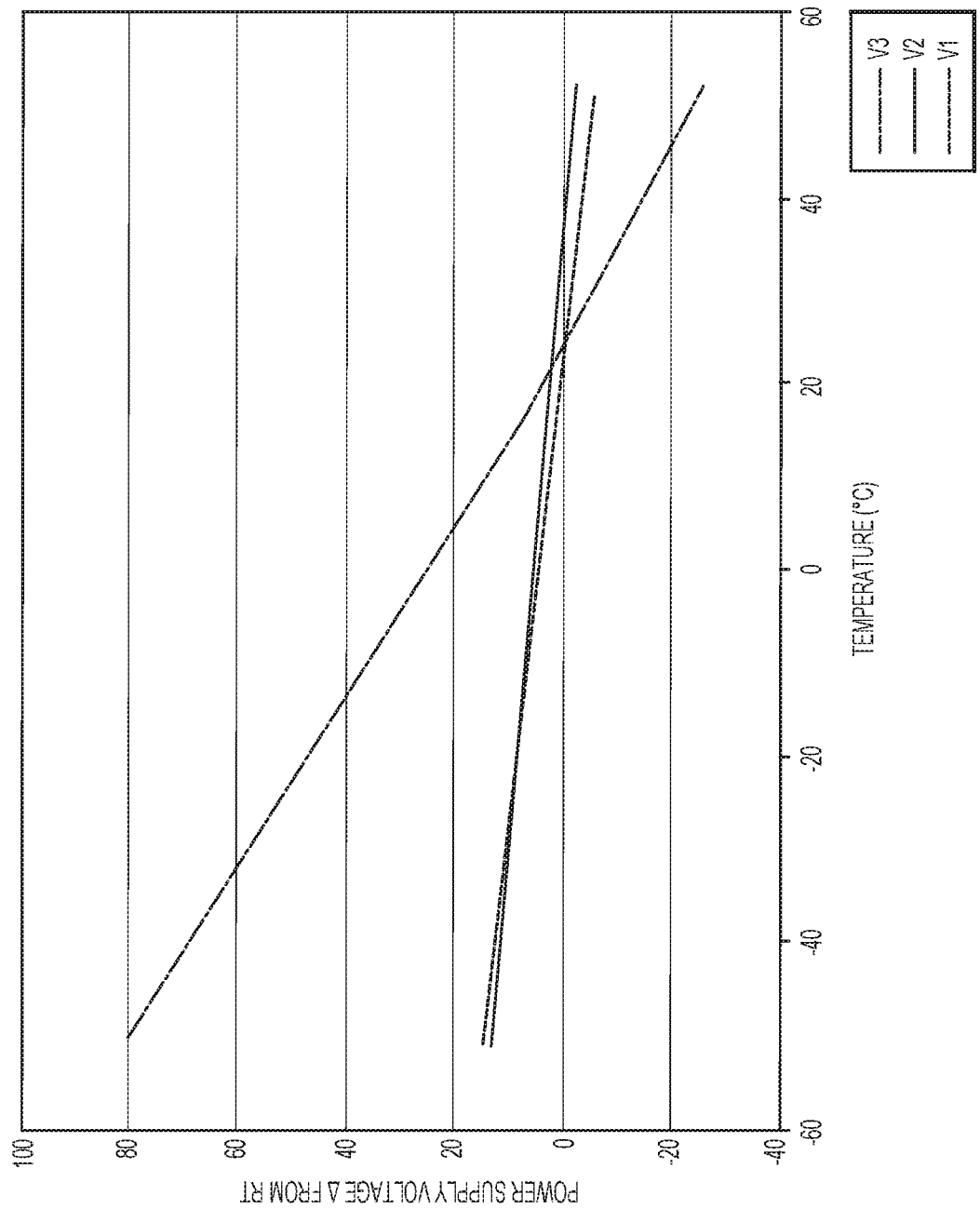
FIG. 3 is a plot showing how three control voltages of the power supply react to changes in temperature without active compensation.

Voltage output changes seen over temperature are driven by changes in the light intensifier components, the intensifier tube to power supply interface (non-ideal but sometimes present) and changes in the power supply's provided voltages. For instance, FIG. 3 is a plot of how the three voltages of the power supply 150 react to changes in temperature without active compensation. The plot of FIG. 3 depicts an average response of 12 power supplies. As shown, the swing in $V_3$ from −50° C. to +50° C. is greater than 100 volts about the room temperature (RT) value.

Figure 4:
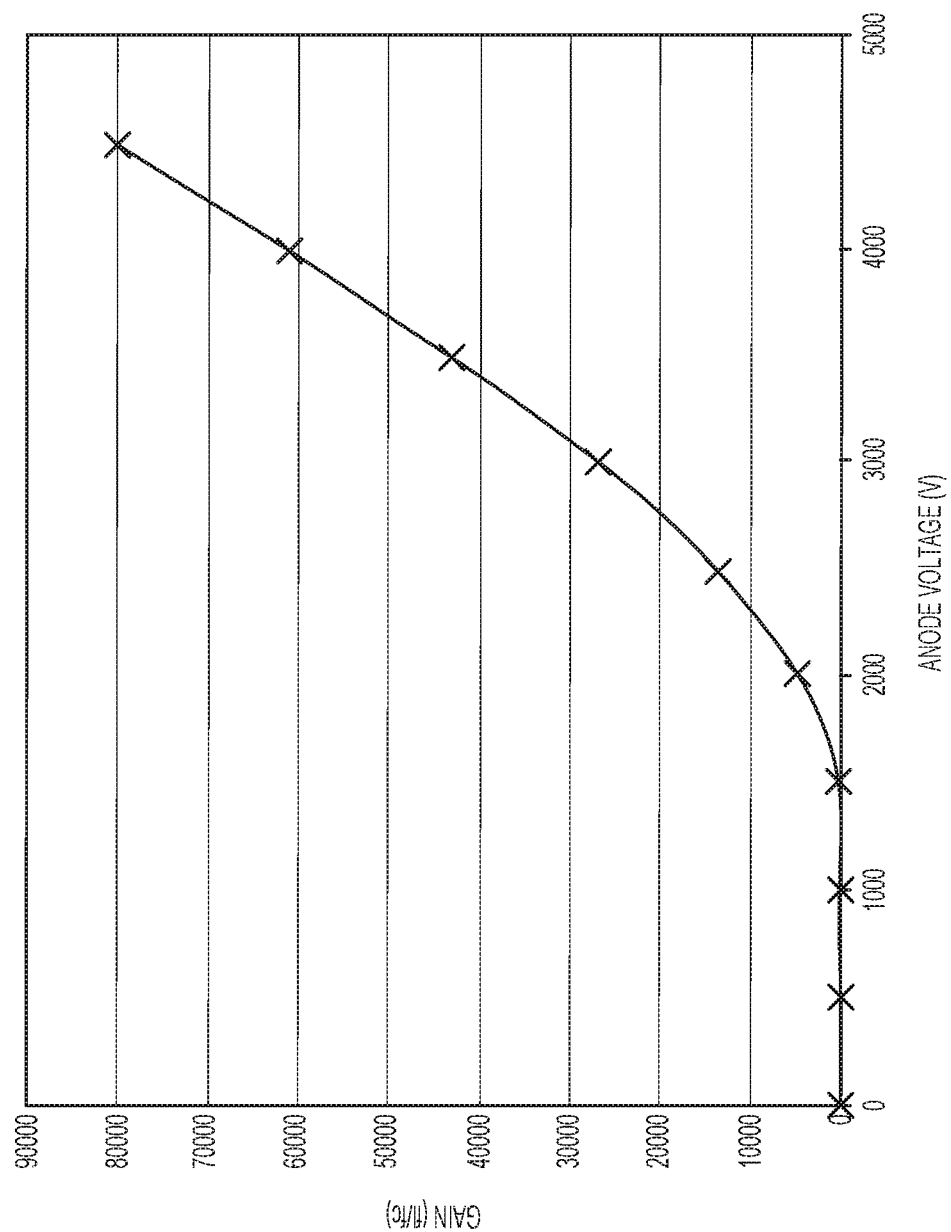
FIG. 4 shows the response of an intensifier tube to changes in $V_3$ (anode voltage) on the output gain (measured at room temperature), in accordance with an embodiment of the invention.

FIG. 4 shows the response of the intensifier to changes in $V_3$ (anode voltage) on the output gain (measured at room temperature) when paired with an intensifier tube.

The dependency of the phosphor light intensity as a function of temperature is shown below:

$$I(T) = \frac{I_0}{\left(1 + D \cdot e^{-E_a/KT}\right)} \quad (1)$$

Depending on the activation energy ($E_\alpha$), the intensity of the phosphor may increase as the temperature is reduced or it might be close to being a constant. With phosphor systems in accordance with one implementation, the intensity of the phosphor increases as temperature is reduced. In accordance with one embodiment, data related to phosphor efficiency change is collected and then used by control logic 180 to compensate the power supply 150 over a range of operating temperatures.

Photocurrent into the input of the MCP 114 is controlled by the $V_1$ voltage effect on the emission probability and the change in material properties as a function of temperature. $V_1$ changes by approximately 20 volts over the temperature range, per FIG. 10. The photoresponse (PR) changes with the change in the field strength between the photocathode 112 and the input of the MCP 114. The spacing does not change with temperature, so the photocathode current changes as shown in FIG. 5.

Figure 5:
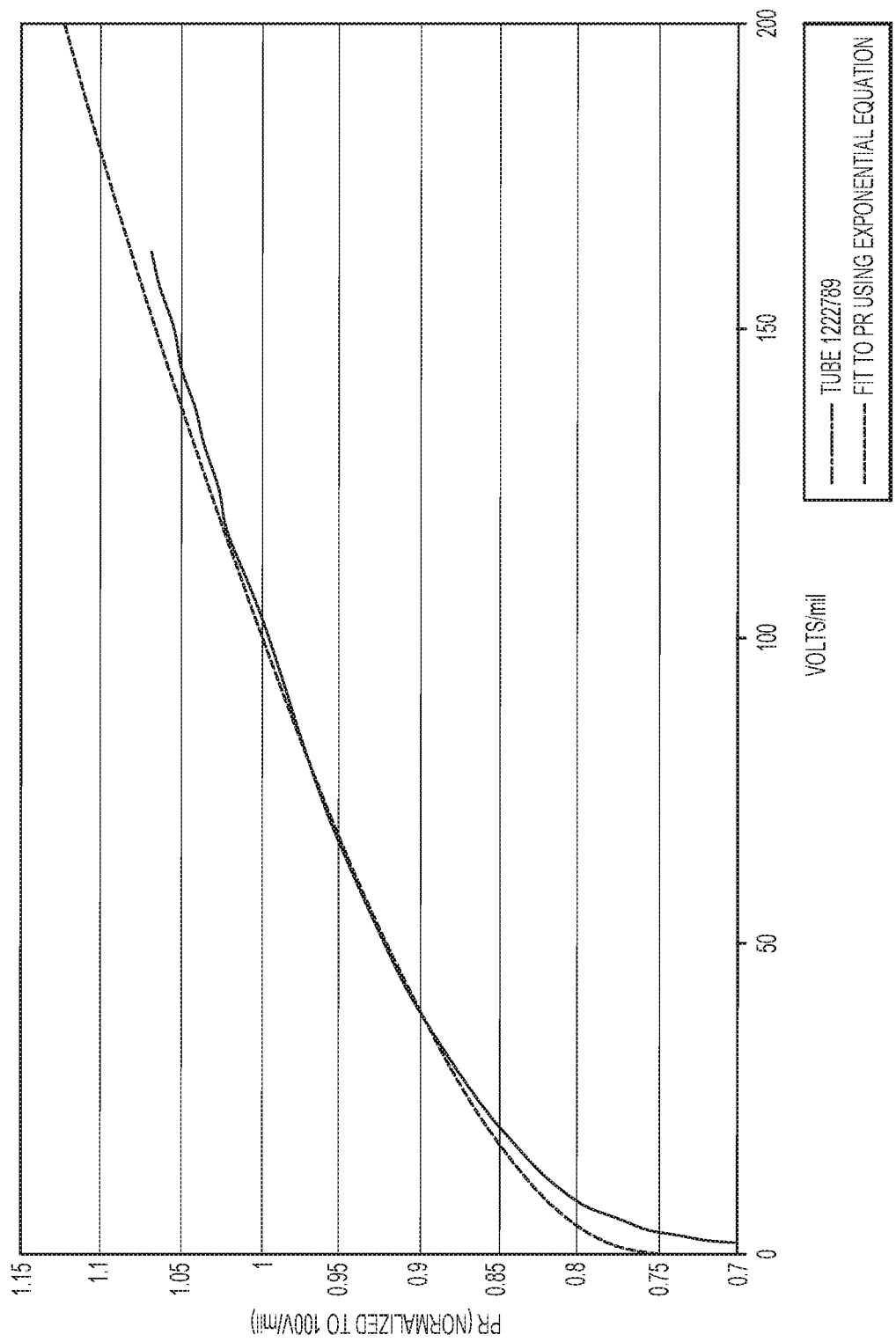
FIG. 5 shows how a photoresponse (PR) changes with the change in the field strength between photocathode and the input of the MCP, in accordance with embodiment of the invention

The dependency in FIG. 5 is described by equation 2 below:

$$QE(E) = (QE)_o e^{\beta\sqrt{E}} \quad (2)$$

Figure 6:
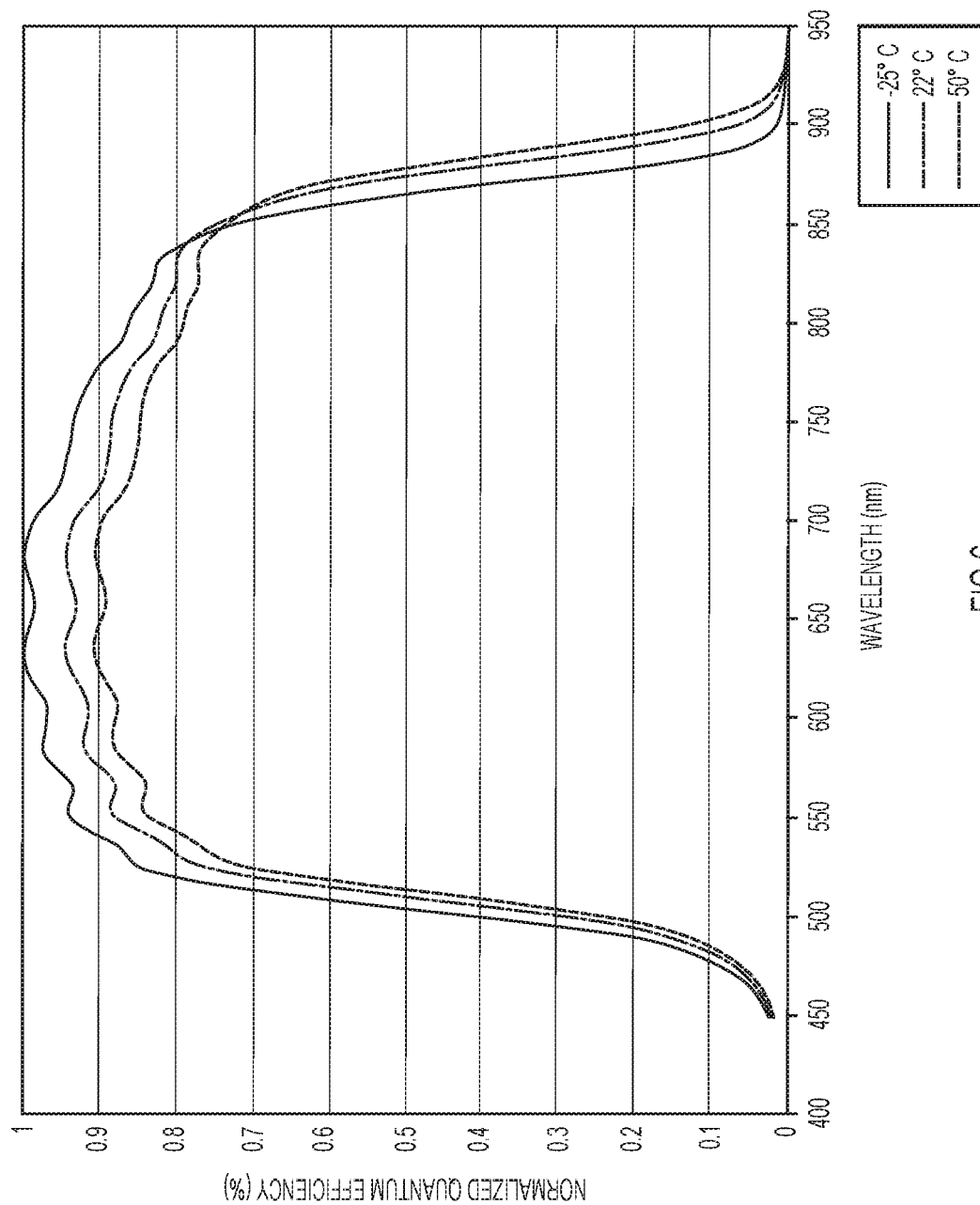
FIG. 6 shows spectral response curves for three operating temperatures in accordance with an embodiment of the present invention.

In equation (2), QE is the quantum efficiency, E is the electric field controlled by $V_1$ and the spacing between the cathode output and MCP input. The only other factor in this equation is β which is a measure of the emission probability of the cathode surface. As the temperature changes, the photocathode bandgap also changes, with the bandgap getting larger as the temperature decreases. An increasing bandgap typically leads to a higher emission probability, larger β. However, the increasing bandgap leads to a shift towards a larger spectral cutoff frequency meaning the cathode is less sensitive to longer wavelength photons. These two shifts are shown in the spectral response curves for three operating temperatures below in FIG. 6.

The height of the maximum shows the improved emission probability and the spectral shift on the right side shows the shift in the bandgap. Once convoluted with the 2,856K light source spectrum this leads to equivalent photocurrent from the photocathode with a change in temperature if the cathode voltage remains fixed.

Many operational values change with an image intensifier assembly, as temperature changes (as detailed above). In general, power supplies and intensifier tubes operate more efficiently at cold temperatures and less so (and more noisily) at hotter than room temperature. The official U.S. government test for behavior at high and low temperatures, Temperature Extremes, has three functional temperatures at which measurements are taken: Baseline or Room Temperature (~23° C.), Hot (nominally +50° C.) and Cold (nominally −50° C.). The various shifts combine to cause significant output brightness changes at temperature when left uncorrected. The degree of change in output brightness (gain) is sufficient for an intensifier assembly whose gain is in specification at room temperature to be out of specification at Cold temperatures due to a typical 70% increase in output brightness.

The gain of the MCP 114 is thought to change by 0.1% per degree temperature change. Due to the MCP gain not changing with temperature, but only with the $V_2(T)$, the adjustment for this variable is fairly well controlled which is why it is picked as the gain controlling parameter for lower light levels.

In one implementation, the night vision device is configured based on a linear relationship between operating voltages and luminous output called the Imputed Brightness Relationship derived from empirical data to model the changes in output brightness with changes in temperature driven voltage changes.

Where the Brightness, B, is given in foot Lamberts or fL, the relationship between B and $V_1$, $V_2$ and $V_3$ is as shown below. Note that the numerical coefficients represent percentage luminous output changes.

$$B = 0.15 \Delta V_1 + 1.5 \Delta V_2 + 0.05 \Delta v_3 \quad (3)$$

This equation, known as the Imputed Brightness Relationship, shows $V_2$ is the strongest contributor to the output brightness of the three operating voltages. So, for every volt change in $V_2$, there will be a 1.5% change in output brightness but a 0.05% gain change for a volt change in $V_3$. Although the changes to $V_3$ are larger in magnitude (see FIG. 3), the output brightness change per volt change in $V_3$ is 30 times less than for a volt change in the $V_2$ voltage. In an embodiment, the power supply changes in operating voltage as a function of ambient temperature are obtained during each power supply's final testing and these changes can also employed to modify the MCP voltage ($V_2$) at temperature.

FIGS. 3 and 4 together show that at −50° C., due to changes in the primarily the $V_2$ and $V_3$ voltages, the output brightness of the intensifier tube would increase without any increase in the $I_3$ sense current set point. This is without considering change in the image tube phosphor efficiency which also changes with temperature.

In order to control the low light level gain over the temperature range, one algorithm is a linear correction of the $V_2$ as a function of temperature where the slope is larger than the simple slope that would adjust only to compensate for that one change. As mentioned above, there are changes with temperature in the power supply, sometimes the interface and the intensifier tube. The increased slope, m, would account for the all these changes including the $V_3$ change, the phosphor efficiency change, $V_1$ change (which increases the photoresponse and the MCP gain), and the $V_2$ change. This linear relationship is shown below in equation 4:

$$V_2(T) = V_2(T_{RT}) + m^*(T - T_{RT}) \quad (4)$$

To compensate for brightness changes in the ABC range ($>2 \times 10^{-4}$ fc), in the power supply 150 the $I_3$ sense current is decreased as a function of temperature expressed below as a first order linear equation:

$$I_{3ABC}(T) = I_{3ABc}(T_{RT}) + m^*(T - T_{RT}) \quad (5)$$

In equation (5), m is the gain slope of the correction factor that best accounts for the slope of the gain change as the result of efficiency changes from all sources as a function of temperature.

In a production environment, it is not practical to characterize each component and each power supply for changes in efficiency over temperature. As such, general empirical relationships are used that account for the normal behavior for intensifier tubes and individual power supply specific changes (from the aforementioned power supply level final test data).

Also, the rate of gain change is greater for temperatures over room temp than for lower temperatures. $V_2$ is modulated at light levels $<2 \times 10^{-4}$ fc and $I_3^{max}$ for light levels over $2 \times 10^{-4}$ fc. So, four linear gain change coefficients are employed to keep luminous output of an image intensifier assembly output constant over the range of $-50°$ C. to $+50°$ C. and for low and high light levels. Each coefficient, which takes the place of the m value in equations (4) and (5) is as detailed below.

$C_1$=Coefficient for low light levels ($<2 \times 10^{-4}$ fc) from 23° C. to +50° C.; $V_2$ is altered (6)

$C_2$=Coefficient for low light levels ($<2 \times 10^{-4}$ fc) from 23° C. to $-50°$ C.; $V_2$ is altered (7)

$C_3$=Coefficient for high light levels ($>2 \times 10^{-4}$ fc) from 23° C. to +50° C.; $I_3^{max}$ altered (8)

$C_4$=Coefficient for high light levels ($>2 \times 10^{-4}$ fc) from 23° C. to $-50°$ C.; $I_3^{max}$ altered (9)

To determine the coefficients, image intensifier assemblies were evaluated at +50° C., 23° C. and $-50°$ C. At these temperatures, the gains are measured (light out/light in fL/fc).

For the model discussed below, the terms employed are as follows:

$G_x$ is the gain at temperature level $x$, (10).

Gain differences are given as $\Delta G_{xy} = G_x - G_y$ where $x$ and $y$ are two temperature levels, (11)

$T_x$ is the temperature at level $x$, (12)

$T_R$=Room Temperature or 23° C. (12)

$T_H$=Hot Temperature–nominally 50° C. (13)

$T_C$=Cold Temperature or –nominally 50° C. (14)

Temperature differences are given as $\Delta T_{xy} = T_x - T_y$ where $x$ and $y$ are two temperature levels (15)

The gain change per volt $V_2$ is given as $\delta_v$ and holds a value of 0.015 (16)

The change in $V_2$ from temperature $x$ to temperature $y$ is $\Delta V_{xy}$, (17)

The normalized gain change per ° C. is given as $\Theta$ where the normalizing factor is the Room Temperature gain, $G_R$ (18)

The basic form of the model the $V_2$ change for light levels $<2 \times 10^{-6}$ fc is:

$$\Delta V_{xy} = C_n \cdot \Delta T_{xy} \quad (19)$$

For two temperatures x and y using a linear coefficient $C_n$.

To derive a low light coefficient, first the $2 \times 10^{-4}$ fc gain change at an extreme temperature is calculated. For this example, the –50° C. cold temperature is used.

$$\Delta G_{CR} = G_C - G_R \quad (20)$$

And the change in temperature is:

$$\Delta T_{CR} = T_C - T_R \quad (21)$$

And the gain change in fL/fc per ° C. (or K) is:

$$\frac{\Delta G_{CR}}{\Delta T_{CR}} \quad (22)$$

To normalize the gain change with reference to the baseline room temperature gain, this quantity is then divided by the room temperature $2 \times 10^{-6}$ fc gain, giving the fractional gain change per degree normalized by the baseline gain yielding at term called $\Theta$.

$$\Theta = \frac{\Delta G_{CR}}{\Delta T_{CR} \cdot G_R} \quad (23)$$

To give the required $V_2$ change to keep the Cold gain the same as the room temperature gain, $\Theta$ is divided by $\delta v$. This quantity is the linear coefficient for gain changes between Room and Cold temperatures:

$$C_{RC} \text{ or } C_2 = \frac{\Theta}{\delta_V} = \frac{\Delta G_{CR}}{\delta_V \cdot \Delta T_{CR} \cdot G_R} \quad (24)$$

where $$\delta_V = \frac{\Delta G}{\Delta V} = 0.015 \quad (25)$$

The $V_2$ change is then $C_2$ times the temperature change at a given temperature, $T_2$ such that $T_2 < T_R$ and the light level is $<2 \times 10^{-6}$ fc.

$$\Delta V_{2R} = C_2 \cdot (T_2 - T_R) = C_2 \cdot \Delta T_{2R} \quad (26)$$

Similarly, the expression for the change in $V_2$ for 23° C. $<T_{2<+50}°$ C. where the light level is $<2 \times 10^{-6}$ fc:

$$\Delta V_{R2} = C_1 \cdot (T_R - T_2) = C_1 \cdot \Delta T_{R2} \quad (27)$$

For the higher light conditions, $>2 \times 10^4$ fc, a similar approach is taken except here a change in screen current is involved. Note that luminous gain and screen current values are linearly proportional and so ratios as shown below are assumed to be equal. Here $I_x$ is the screen current at temperature x. In (28) the relationship between screen current at Room Temperature (x=R) and an elevated temperature (x=2) is shown.

$$\frac{I_R}{I_2} = \frac{G_R}{G_2} \quad (28)$$

And a change in screen current, $\delta_1 \cdot I$, will be of the form:

$$I_2 = \delta_1 I_1 + I_1 \text{ and } \delta_1 = C_n \cdot \Delta T_{2R} \quad (29)$$

$$I_2 = I_1(C_n \cdot \Delta T_{2R}) + I_1 = I_1 \cdot [(C_n \cdot \Delta T) + 1] \quad (30)$$

Or $$I_{T2} = I_{T1} \cdot [C_n(T_2 - T_1) + 1] \quad (31)$$

Here $\delta_1$ is the product of the Screen Current to luminous gain linear coefficient ($C_n$) and the temperature deviation from $T_R$. $\Delta T_{2R}$ is the temperature difference between $T_2$ and $T_R$.

Note that here $C_n$ is of the same form as for coefficients on voltage terms:

$$C_3 = \frac{\Delta G_{R2}}{G_R \Delta T_{R2}} \quad (32)$$

And since $$\frac{\Delta G_{R2}}{G_R} = \frac{G_R - G_2}{G_R} = \frac{G_R}{G_R} - \frac{G_2}{G_R} = 1 - \frac{G_2}{G_R} = 1 - \frac{I_2}{I_R} = \frac{\Delta I_{R2}}{I_R} \quad (33)$$

$$C_3 = \frac{\Delta I_{R2}}{I_R \cdot \Delta T_{R2}} \quad (34)$$

and $$C_4 = \frac{\Delta G_{2R}}{G_R \Delta T_{2R}} \quad (35)$$

For a temperature below $T_R$ where the light level is $\geq 2 \times 10^{-4}$ fc the model $I_2 = \delta_1 I_1 + I_1$ becomes, $$I_2 = I_R \cdot [C_4(T_2 - T_R) + 1] \quad (37)$$

And for a temperature above $T_R$ where the light level is $> 2 \times 10^{-4}$ fc:

$$I_2 = I_R \cdot [C_3(T_R - T_2) + 1] \quad (38)$$

So, for correcting luminous output over temperature at light levels high enough that ABC is invoked, the generalized version of equations 37 and 38 is employed:

$$I_{T2} = I_{T1} \cdot [C_n(T_2 - T_1) + 1] \quad (39)$$

Again, the above linear control equations are the most basic versions of temperature compensation. More complicated algorithms may be implemented with still more parameters.

Usage Compensation

During operation of light intensifier 110 its response will tend to degrade as the amount of extracted charge from the MCP 114 increases. An accelerated reliability test may be designed to subject the intensifier 110 and its associated power supply 150 to increased temperature and high light conditions to determine a mean time between failure. In this case, the failure is a degradation in performance to a minimum, predetermined, level. Three criteria may be evaluated during reliability testing: gain, SNR, and EBI (Equivalent Background Intensity). Typically, EBI tends to decrease as reliability testing continues and, in most cases, the value is below the specification. The SNR does decrease on reliability testing, although usually not at the same rate as the gain. So, low gain is the typical failure mode for image intensifiers. The temperature compensation of V2 and $I_{3ABC}$ detailed above will aid in controlling to some extent the amount of current extracted from the MCP 114 under different light levels A first step to developing usage compensation techniques is to realize that over time the gain of the MCP 114 decays as a function of the extracted charge when the intensifier reaches the $I_{3ABC}$ point. Using digitally controlled power supply 150 including chronometer 165, which can be incorporated into CPU 160 or be a separate component, or even be part of control logic 180, the power supply 150 can increment a counter for conditions which put the intensifier under stress, i.e., conditions that force the ABC current limit to be exercised. The next step is to determine how much the MCP V2 voltage must be adjusted as charge is extracted from the MCP 114 and to determine whether temperature plays a role in the gain decay. The final step is the development of algorithms or models which cover the majority of intensifiers fabricated but have limits on the adjustments for the outlying units of the distribution.

Figure 7:
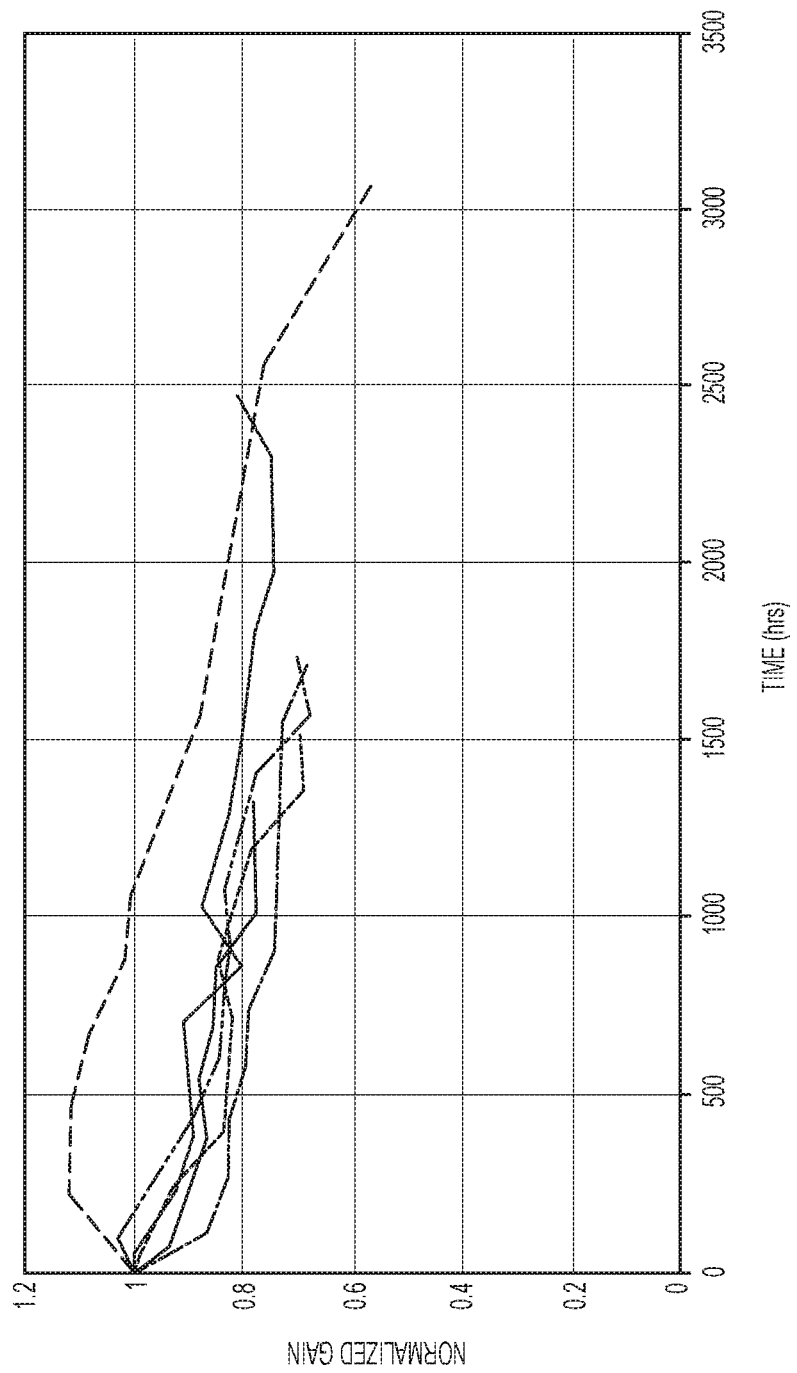
FIG. 7 shows normalized gain as a function of time in reliability for several tested intensifier tubes, in accordance with an embodiment of the present invention.

FIG. 7 shows the normalized gain as a function of time in reliability for several tested intensifier tubes 110. The dashed line is the average of 5 filmed intensifier tubes, and the solid lines are 5 individual unfilmed intensifier tubes.

Figure 8A:
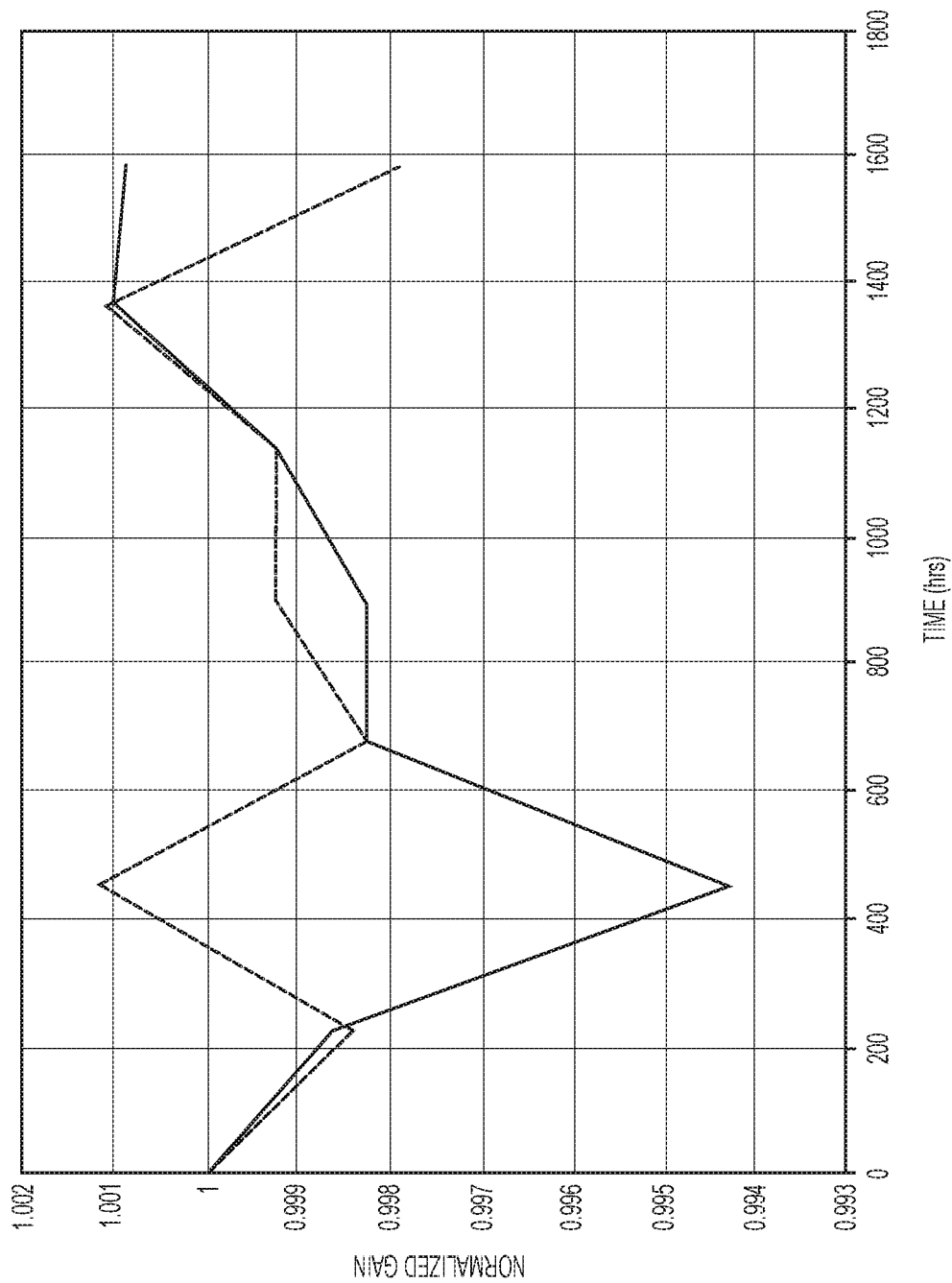
FIG. 8A shows normalized gain curves in accordance with an embodiment of the present invention.

In the case of the filmed intensifier tubes the gain could increase or remain the same during the initial phase of testing. The unfilmed intensifier tubes see an almost immediate decrease in the gain as they are put under stress. Again, these curves are from a typical accelerated reliability test which includes high light pulses and elevated temperature. To determine the coefficients of a compensating algorithm, the filmed intensifiers were subjected to the same light levels, with and without temperature, and the V2 voltage was reset to maintain the gain as time progresses. The curve of FIG. 8A shows the normalized gain curves where the dashed curve is at elevated temperature and the solid curve is at room temperature, each curve is an average of 5 intensifier tubes. Some of the spread in the normalized gain is just due to the repeatability of the gain measurement equipment.

The curve of FIG. 8B shows the voltage differential that is preferably added to the room temperature $V_2$ set point to maintain the same gain as a function of time on the reliability test. After about 500 hours on the test at room temperature, V2 adjustment is about 1.2 volts every 100 hours and the elevated temperature adjustment is 1.8 volts every 100 hours. The conclusion is that elevating the temperature does increase the rate of decay, so any usage compensation algorithm preferably takes this into account. As pointed out earlier, the unfilmed intensifier tubes experience an almost immediate decay in gain, whereas the filmed intensifier tubes have an initial period where the gain could increase or remain the same. Therefore, the algorithm or model is preferably configured to not apply correction factors until a certain period of time has elapsed, i.e., a delay in increasing the $V_2$. Finally, there is the chance that a portion of the distribution will experience a much slower decay. Applying the full correction to such devices would push the corrected gain outside the allowable upper limit. In this case, the algorithm or model preferably caps the allowed voltage change to a maximum correction, and after that point the power supply 150 would not increase the $V_2$ and the gain of the intensifier will begin to drop. In view of the foregoing, and in one embodiment, parameters of an example usage algorithm include $t_{delay}$, $\Delta V_2$, $\delta(T)$, $\Delta V_{2max}$, $\Delta t$ where $t_{delay}$ is the time which must pass before the algorithm is applied, $\Delta V_2$ is the correction added to the $V_2$ setpoint as a function of time, $\delta(T)$ is the correction due to temperature, $\Delta t$ is the amount of time in the high light condition, and $\Delta V_{2max}$ is the maximum allowed $V_2$ adjustment. With such parameters, the example compensation algorithm then becomes if $(V2(t)-V2(t_o))<\Delta V2_{max}$
    if $(t \geq t_{delay})$
        $V2(t)=V2(t_{previous})+\Delta t * \Delta V2 * \delta(T)$
    endif
endif Those skilled in the art will appreciate that other algorithms or models are possible with different and/or more parameters.

Figure 9:
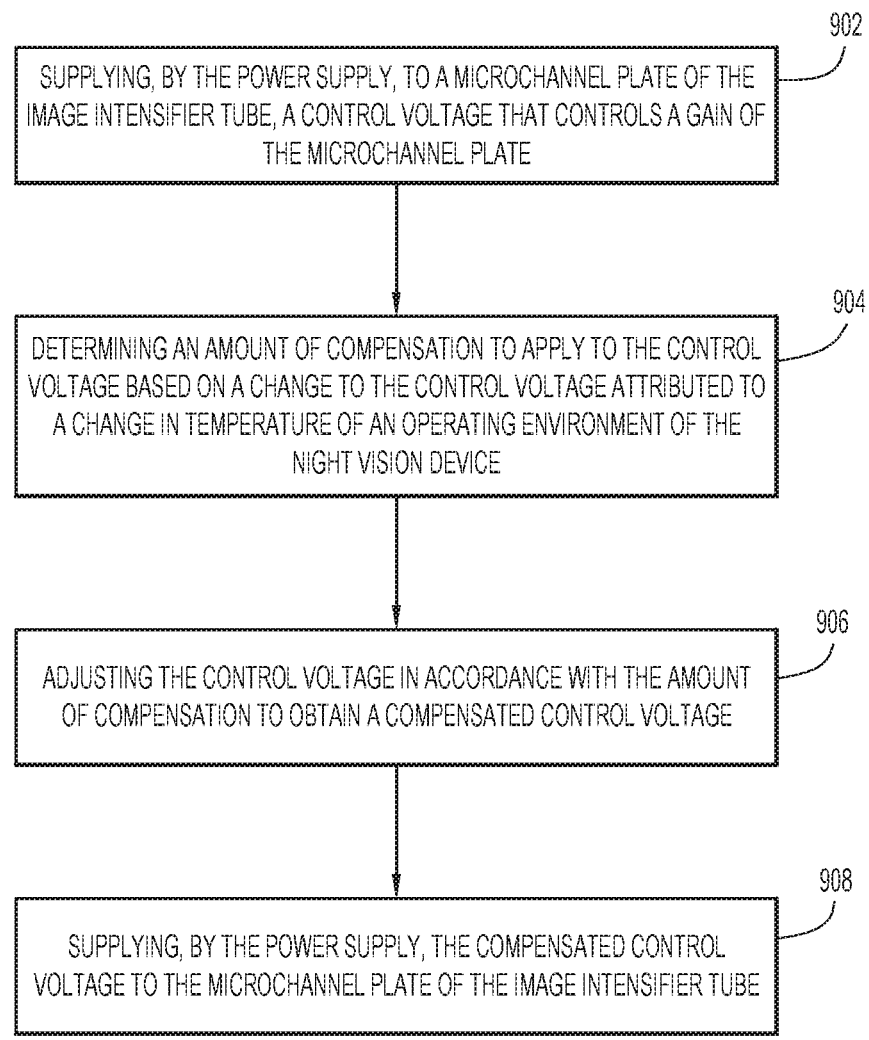
FIG. 9 is a flowchart depicting a series of operations or a process for controlling the performance of a night vision device in accordance with an embodiment of the present invention.

FIG. 9 is a flowchart depicting a series of operations, a method or a process for controlling the performance of a night vision device in accordance with an embodiment of the invention. As explained, the night vision device includes a power supply and an image intensifier tube in communication with the power supply. At 902, the method includes supplying, by the power supply, to a microchannel plate of the light intensifier tube, a control voltage that controls a gain of the microchannel plate. At 904, the method includes determining an amount of compensation to apply to the control voltage based on a change to the control voltage attributed to a change in temperature of an operating environment of the night vision device. At 906, the method includes adjusting the control voltage in accordance with the amount of compensation to obtain a compensated control voltage. And at 908 the method includes supplying, by the power supply, the compensated control voltage to the microchannel plate of the image intensifier tube. In one embodiment, and taking usage into consideration, the method may further include determining whether the night vision device has been used for a predetermined amount of time, and only after the night division device has been used for the predetermined amount of time, is the method configured to supply the compensated control voltage to the microchannel plate of the light intensifier tube.

In sum, the embodiments described herein provide a digitally controlled power supply for a light intensifier tube that provides enhanced control processes for controlling the performance of a night vision device by, among other things, taking into account usage time and operating environment temperature and compensating for the same.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed:

1. A method of controlling the performance of a night vision device, the night vision device including a power supply and a light intensifier tube in communication with the power supply, the method comprising:
   supplying, by the power supply, to a microchannel plate of the light intensifier tube, a second control voltage that controls a gain of the microchannel plate;
   determining whether a difference between the second control voltage and a first control voltage supplied at a time earlier than the second control voltage is less than a predetermined value;
   when the difference is less than the predetermined value, determining whether the night vision device has been used for a predetermined amount of time;
   only after the night vision device has been used for the predetermined amount of time, adjusting the second control voltage to compensate for a change to the second control voltage resulting from time of use to obtain a third control voltage; and
   supplying, by the power supply, the third control voltage to the microchannel plate of the light intensifier tube.

2. The method of claim 1, where the predetermined amount of time is about 500 hours.

3. The method of claim 1, wherein determining whether the night vision device has been used for the predetermined amount of time comprises monitoring a chronometer that is in communication with a central processing unit of the power supply or that is associated with control logic in the power supply.

4. The method of claim 1, wherein adjusting the second control voltage comprises adding a correction factor to the second control voltage.

5. The method of claim 4, wherein the correction factor is based on an amount of time the night vision device has been subjected to a high light condition, is a correction added to a set point of the second control voltage as a function of time, and is a correction due to temperature.

6. The method of claim 5, wherein the high light condition corresponds to light levels greater than $2 \times 10^{-4}$ fc.

* * * * *